Feb. 21, 1950     R. W. MICHLER     2,498,171
FEELER GAUGE
Filed Jan. 6, 1948
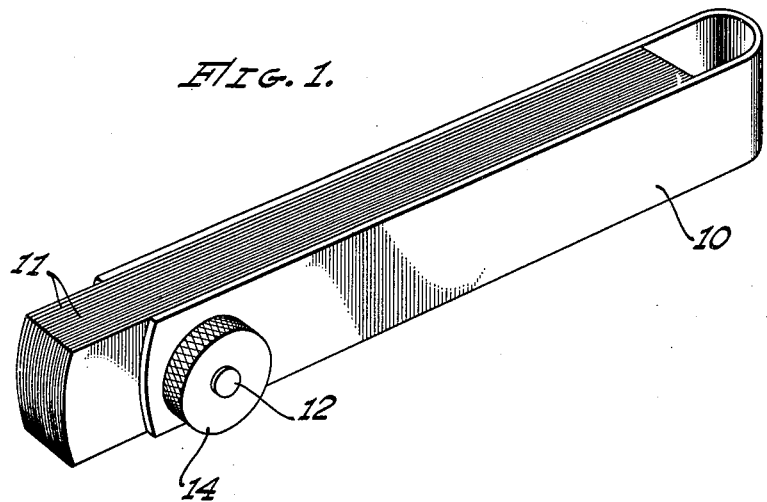
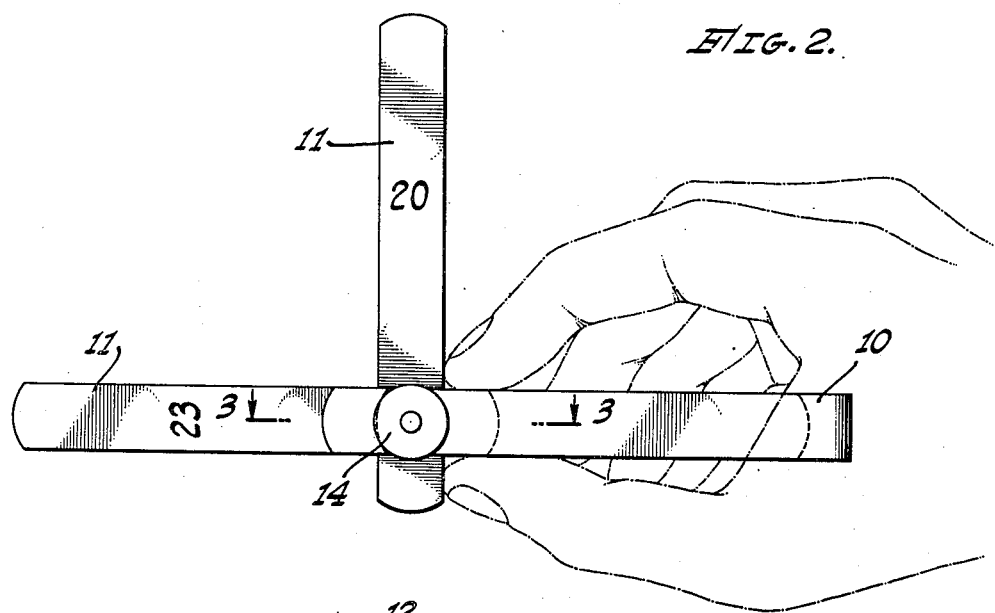
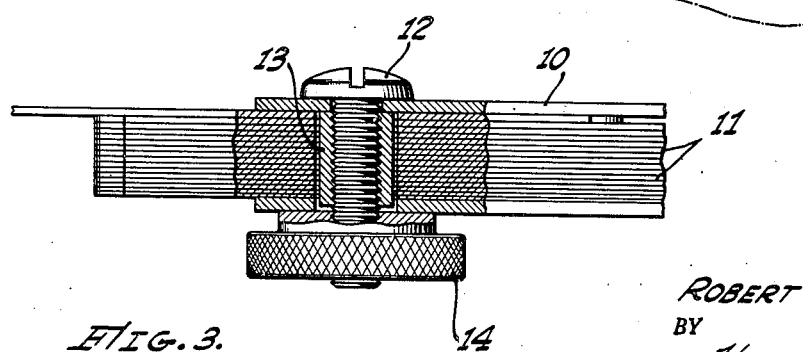
INVENTOR.
ROBERT W. MICHLER,
BY
Hazard & Miller
ATTORNEYS.

Patented Feb. 21, 1950

2,498,171

UNITED STATES PATENT OFFICE 2,498,171

FEELER GAUGE

Robert W. Michler, Perris, Calif.

Application January 6, 1948, Serial No. 775

1 Claim. (Cl. 33—168)

This invention relates to a thickness gauge and in particular to a thickness gauge having a plurality of thickness measuring leaves foldable within a gauge case and so constructed that the leaves may be unfolded from the case by merely pressing on portions of the leaves extending from the case.

A number of prior thickness measuring gauges have been constructed with a U-shaped case with a plurality of thickness measuring leaves pivoted near the ends of the legs of the case so as to be foldable within the legs and there has been provided in the case finger cutouts to enable a person to pinch or grasp the edges of the blades and move them outward into operative position. This type of thickness gauge has been in wide use for many years but has a disadvantage in that it is difficult to catch hold of the blades through the finger cutouts due to a number of reasons including the fact that because of the size of the gauge the finger cutouts must necessarily be rather small and secondly the usual operator desiring to use the thickness gauge has his hands oily or greasy adding to the difficulty of withdrawing the leaves from folded position.

It is a main object of this invention to provide a thickness gauge such that the leaves thereof may be quickly and easily moved from folded or inoperative position to unfolded or operative position and this is accomplished by constructing the leaves of such a length that they protrude from the case a distance such as to enable a person to press on the extended portions of the leaves and pivot the leaves out into operative position.

With the foregoing and other objects in view, which will be made manifest in the following detailed description and specifically pointed out in the appended claim, reference is had to the accompanying drawings for an illustrative embodiment of the invention, wherein:

Fig. 1 shows a perspective view of the improved thickness gauge;

Fig. 2 discloses a side elevation view of the thickness gauge showing one of the leaves in using position and another of the leaves in position to be used; and Fig. 3 shows an enlarged sectional view along lines 3—3 of Fig. 2.

Referring to the accompanying drawings wherein similar reference characters designate similar parts throughout, the thickness gauge comprises a U-shaped case 10 having a plurality of thickness measuring leaves 11 enclosed between the legs of the case 10 and pivoted to the case at the ends of the case preferably by a pivot screw 12 which has an internally threaded collar 13 screwed thereon or otherwise connected thereto so as to prevent rotation of the screw, said collar passing through in line holes provided in leaves 11, as shown in Fig. 3. Screw 12 has a knurled nut 14 threaded thereon so that the leaves may be locked in any desired position by threading the nut so as to draw the legs of the case together.

The thickness measuring leaves 11 are of such length when in folded position, as shown in Fig. 1, that they extend outward beyond the ends of the legs of the case 10 a distance such as to enable an operator to press on the protruding portions of the leaves and pivot the leaves out of folded position. It is preferred that the distance that the leaves protrude be approximately a finger's width or somewhere between ⅛ inch and ¾ inch although the invention is not limited to these particular figures. In the particular form of the invention shown the apertures in the leaves are approximately ⅙ of the length of the leaves from the end of the leaves but the important feature of the invention is the amount the leaves protrude from the case, and from the drawings it can be seen that this distance is somewhat greater than the distance from the pivotal axis to the end of the case. It is preferred that the leaves do not extend outward a great distance because if so the length of the thickness gauge is increased which is objectionable since it is desired that this type of tool be of a length such that they can be easily carried around in the pockets of the machinists, operators, and the like and if the distance is too short it is not possible to easily and quickly press on the extended portions and to unfold the leaves. Therefore, the desired distance is that at which the ordinary operator may easily press on the extended portions and pivot the leaves from the folded position.

It is contemplated that in normal use the thickness gauge will be carried around in the folded position, as shown in Fig. 1, preferably with the nut 14 tightened down to prevent the leaves from accidentally emerging from the case. When it is desired to determine the thickness of a crevice or crack or space between objects or in an object the nut 14 is loosened and the ends of the leaves 11 protruding beyond the case 10 are pressed on thereby pivoting the major part of the leaves out from the case where an appropriate leaf may be selected and a trial thickness run made and if not correct a second approximation is made until the thickness is obtained.

Fig. 2 discloses the thickness gauge of the present invention with some of the leaves unfolded and in Fig. 2 it can be seen that the leaf having the numeral 23 thereon extends back far enough to enable an operator to grasp the case and while doing so hold on to the end of the leaf thereby preventing the leaf from moving while the operator is manipulating it into the desired place, which would otherwise occur. Of course, the leaf having the numeral 23 thereon may be locked in the position shown by means of the nut 14 but by the construction of the present invention the necessity of locking the leaf during a measurement is eliminated thereby speeding up work. In Fig. 2 the leaf having the numeral 20 thereon is shown in a position at approximately right angles to the case and this is only a suggestive manner of using the gauge and it is obvious that the leaf 20 can merely be folded back into the case but as the leaf 20 is shown it is in position to be quickly and easily used and even though in a position at right angles to the case does not prevent an operator from holding the end of the extended leaf 23 to prevent the leaf from moving; therefore no matter in what manner the operator desires to use the thickness gauge it is always possible to pivot the leaves out of folded position with ease and rapidity and to control the movement of the particular leaf being used without the necessity of locking the leaf in extended position so that several trials can be quickly made.

Another advantage of the thickness gauge of the present invention is that left handed or right handed operators may use it more easily than a thickness gauge of the type having finger cutouts in one side of the thickness gauge case since it is obvious that by putting the cutouts on one side of the case such construction automatically makes the thickness gauge either a left handed or a right handed gauge so that either right handed or left handed operators find it more difficult to use a finger cutout type thickness gauge depending on which side of the case the finger cutouts are placed. Applicant's device is readily used by either right handed or left handed operators since it is only necessary to press on the extended portion of the leaves and unfold the leaves from the case.

Another advantage of the thickness gauge of the present invention is that when one of the leaves is locked in extended position it is more firmly locked than an extended leaf of the ordinary type thickness gauge because there is almost twice as much area of contact between the case and the extended leaf or the extended leaf and the adjacent leaves as compared to a thickness gauge of the finger cutout type. This added frictional surface results in a very secure locking of the extended leaf so that no movement is possible.

Various changes may be made in the details of construction without departing from the spirit and scope of the invention as defined by the appended claim.

I claim:

A device of the class described comprising a pair of spaced legs joined at one pair of ends, the other pair of ends having in line apertures therethrough, a screw having the head thereof abutted against one of the legs and the threaded portion of the screw extending through the legs, a sleeve threaded to fit over the screw receivable through the other leg and adapted to be threaded up against said one leg to prevent rotation of the screw, the outside surface of the sleeve being substantially smooth, a plurality of thickness leaves rotatable about the sleeve, and a knurled nut threaded to fit the screw threadable thereon up against said other leg to clamp the leaves between the legs whereby the leaves can be clamped in any position, the leaves being movable between the legs to a folded position and outwardly from the legs to an operative position, the leaves being of such length that when in folded position, the leaves extend outwardly beyond the ends of the legs a distance such as to enable an operator to readily press on the protruding portions of the leaves and pivot the leaves out from folding position, the protruding portions of the leaves providing additional frictional surfaces when a leaf is locked in operative position to better hold the leaf.

ROBERT W. MICHLER.

REFERENCES CITED

The following references are of record in the file of this patent:

UNITED STATES PATENTS

| Number | Name | Date |
|---|---|---|
| 890,150 | Marble | June 9, 1908 |
| 1,036,664 | Marble | Aug. 27, 1912 |
| 1,524,474 | Buck | Jan. 27, 1925 |
| 2,237,378 | Thienemann | Apr. 8, 1941 |